(12) United States Patent
Collier

(10) Patent No.: US 7,516,169 B2
(45) Date of Patent: Apr. 7, 2009

(54) GENERATING RANDOM DATA

(75) Inventor: James Digby Yarlet Collier, Cambridgeshire (GB)

(73) Assignee: Cambridge Silicon Radio Limited, Cambridge (GB)

( * ) Notice: Subject to any disclaimer, the term of this patent is extended or adjusted under 35 U.S.C. 154(b) by 832 days.

(21) Appl. No.: 10/059,260

(22) Filed: Jan. 31, 2002

(65) Prior Publication Data

US 2002/0107897 A1 Aug. 8, 2002

(30) Foreign Application Priority Data

Feb. 5, 2001 (GB) ................................. 0102840.6

(51) Int. Cl.
*G06F 1/02* (2006.01)
(52) U.S. Cl. ..................................................... 708/251
(58) Field of Classification Search .......... 708/250–256
See application file for complete search history.

(56) References Cited

U.S. PATENT DOCUMENTS

| | | | | |
|---|---|---|---|---|
| 4,694,412 A * | 9/1987 | Domenik et al. | ............ | 708/251 |
| 4,799,259 A * | 1/1989 | Ogrodski | ..................... | 708/251 |
| 5,383,143 A * | 1/1995 | Crouch et al. | ................ | 708/254 |
| 5,727,063 A * | 3/1998 | Aiello et al. | ................. | 708/254 |
| 6,466,142 B1 * | 10/2002 | Barbano | ..................... | 708/254 |
| 6,647,402 B1 * | 11/2003 | Chiu | ........................... | 708/250 |
| 6,728,740 B2 * | 4/2004 | Kelly et al. | .................. | 708/250 |
| 6,766,312 B2 * | 7/2004 | Landt | .......................... | 708/252 |
| 6,795,837 B1 * | 9/2004 | Wells | .......................... | 708/251 |
| 2004/0030734 A1 * | 2/2004 | Wells et al. | | |

FOREIGN PATENT DOCUMENTS

| | | |
|---|---|---|
| GB | 2 333 652 A | 7/1999 |
| JP | 11219281 A | 8/1999 |
| JP | 2001005383 A | 1/2001 |
| WO | WO 00 16182 A1 | 3/2000 |
| WO | WO 00 75761 A1 | 12/2000 |

OTHER PUBLICATIONS

Ahmad et al., BIST reseeding with very few seeds, 2003, IEEE, pp. 1-11.*

* cited by examiner

*Primary Examiner*—Chat C Do
(74) *Attorney, Agent, or Firm*—Novak Druce DeLuca + Quigg LLP

(57) ABSTRACT

A method for generating random data, the method comprising repeatedly performing a series of operations, and the series of operations comprising processing a seed value to generate a resulting value for use as the seed value in a subsequent performance of the series of operations and to generate output random data; wherein the series of operations also comprises: determining whether a predetermined amount of new truly random data is available; and if such data is available, modifying the generation of at least the resulting value in dependence on the new truly random data.

14 Claims, 1 Drawing Sheet

US 7,516,169 B2

GENERATING RANDOM DATA

FIELD OF THE INVENTION

This invention relates to generating random data, for example for use in encryption and authentication systems.

BACKGROUND OF THE INVENTION

Numerous encryption and authentication systems call for the use of random numbers, for example for generating challenges during authentication. Examples are DES and RSA. In systems that offer typical levels of security, random numbers in the range from around 50 to 150 bits in length are required. One way to form truly random numbers of this type is to digitise a noisy analogue value, such as a voltage level, and to use the least significant bits of the digitised result to form the random number. However, this method requires some time to gather enough bits to form a random number of the length that is required for typical encryption systems. Therefore, in most situations an algorithm that generates pseudo-random numbers is used instead. The numbers generated by such an algorithm are not truly random, but are deterministic. Thus this method has the disadvantage that if the algorithm and its seed are known the pseudo-random numbers can be predicted, permitting a third party to break the encryption or authentication scheme.

There is therefore a need for a method that can quickly produce random numbers that have the property that the next number produced can not be predicted from the previous numbers.

SUMMARY OF THE INVENTION

According to one aspect of the present invention there is provided a method for generating random data, the method comprising repeatedly performing a series of operations, and the series of operations comprising processing a seed value to generate a resulting value for use as the seed value in a subsequent performance of the series of operations and to generate output random data; wherein the series of operations also comprises: determining whether a predetermined amount of new truly random data is available; and if such data is available, modifying the generation of at least the resulting value in dependence on the new truly random data.

According to the second aspect of the present invention there is provided a device for generating random data, the device comprising: a source of truly random data; a store for storing a seed value; and processing means for performing a series of operations comprising processing the seed value to generate a resulting value for storage in the store for use as the seed value in a subsequent performance of the series of operations and to generate output random data; wherein the series of operations also comprises: determining whether a predetermined amount of new truly random data is available; and if such data is available, modifying the generation of at least the resulting value in dependence on the new truly random data.

Preferably the said modifying step comprises modifying the seed value prior to generating the resulting value. Alternatively, the modifying step could comprise modifying a further value, or modifying the resulting value. The said modifying step preferably comprises performing exclusive-OR or addition operations on at least some of the bits of the seed value with corresponding bits of the new truly random data. The seed value could be modified in a single variable or in transformation from one variable to another.

The output random data is preferably generated by processing the resulting value.

The truly random data is suitably generated by measurement of a random process at least partially external to the random data generator, for example by comparing the rates of two oscillators.

Preferably only one of the oscillators is a crystal-controlled oscillator. The other oscillator could be embodied on an integrated circuit. Preferably one of the oscillators is more accurate and/or stable and/or immune to environmental variation than the other oscillator. The truly random data may be generated by counting the number of oscillations of the one of the oscillators in a predetermined number of oscillations of the other of the oscillators. Preferably the said other of the oscillators is the slower of the oscillators.

The truly random data may be one or more of the least significant bits of the said number of oscillations.

BRIEF DESCRIPTION OF THE DRAWINGS

The present invention will now be described by way of example, with reference to the accompanying drawing, in which.

DESCRIPTION OF THE PREFERRED EMBODIMENTS

Figure 1:
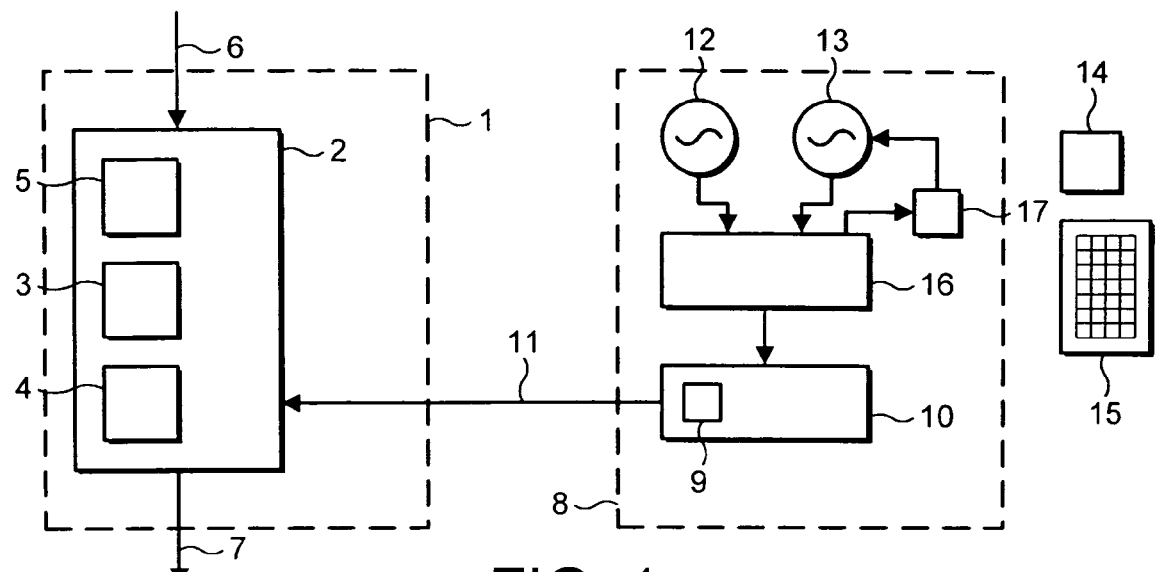
FIG. 1 is a block diagram of a communications device including a random number generator.

The device of FIG. 1 includes a pseudo random number generator 1. The random number generator is shown as including a processor 2 that includes general purpose processing hardware 3, non-volatile program memory 4 for storing program code for the processing hardware 3 and volatile temporary store memory 5 for use by the processing hardware in performing processing operations. However, any suitable means of data processing, including hard-wired processing apparatus and mixed hardware/software embodiments could be used. The pseudo random number generator has an input 6 by means of which it can be invoked to output random data at output 7. The random number generator has access to a source 8 of truly random data. In the embodiment of FIG. 1 the source is external to the random number generator and has another function in the communications device. However, the source could be internal to the random number generator and/or could have a dedicated function of forming random data.

The source 8 suitably includes a store 10 for storing truly random bits as they become available for use by the random number generator. The random number generator has access to that store over link 11 for determining how many truly random bits are available, for reading the truly random bits that are available, and for resetting the store once the bits in it have been used.

When a call for random data is received at input 6 by the random number generator 1 the processing means 2 performs a series of processing steps as described below to generate a random number. The random number is then output by the random number generator at output 7. When the random number generator is called the processing means is arranged to access a seed value stored in temporary store 5, perform an algorithm which takes the seed value as input and based on that seed value to generate random data and a seed value which is stored for use by the next iteration of the algorithm. As part of the algorithm the processing means determines whether new truly random data, which has not been used in a previous iteration of the algorithm, is available from the source 8. If such data is available the processing means modifies the seed value originally taken for the present iteration in accordance with the new truly random data, and uses that modified seed as the basis for the present iteration; otherwise the seed as originally taken is used as the basis for the present iteration. In this way, truly random data can be used as it comes available in order to randomise the formation of the random data, without the formation of the data having to wait for truly random data to be available. This has the key advantages that by the time a sufficient number of outputs 7 have been collected to allow prediction of the next output, the seed will have changed in an unpredictable way.

One example of an algorithm that could be used will now be described.

Before the algorithm is executed, a number of constant values must be defined. These constant values may suitably be defined when the random number generator is designed or constructed—i.e. at system build time. The constant values are as follows:

N represents an integer of around 800.

L is a number of truly random bits that may be available from the source 8.

$K_1$ and $K_2$ are small Fermat primes such as 3, 17, 257 and 65537 ($K_1$ and $K_2$ may be equal).

$p_1$ and $p_2$ are distinct prime numbers of length N/2. If a "strong-S-prime", where S is a non-negative integer, is defined as a prime p such that p−1 has a strong-(S−1)-prime factor of at least ¾ as many bits' length as p, a strong-0-prime being simply a prime; $p_1$ and $p_2$ are selected to be strong-2-primes.

M is the product of $p_1$ and $p_2$.

Once M has been calculated $p_1$ and $p_2$ are preferably discarded irretrievably or stored with high security.

The constant values that are called upon during the performance of the algorithm: L, $K_1$, $K_2$ and M; are preferably stored in the non-volatile memory 4.

At each iteration of the algorithm a seed value is taken as input to the algorithm. The seed value is modified by the algorithm, and the modified value is taken as the seed for the next iteration of the algorithm. The seed to be used for the next iteration to be performed is stored in the temporary store 5. An initial seed is required by the algorithm for input on the first iteration for which it is called to generate random data. One way to form the initial seed is to collect a series of random bits from the source 8, and to store those in successive bit positions in a specified location 9 in the store 10. Another way to form the initial seed is to store a further constant value in the non-volatile memory 4; to load that value into the temporary store 5; and then to perform a specified number of iterations of the algorithm, making use of random data from the source 8 to modify the seed as successive iterations are called. Either of these methods is suitably employed when the communication device is initialised (e.g. at power-up) so that the random number generator is then ready for use, holding a truly random seed.

Figure 2:
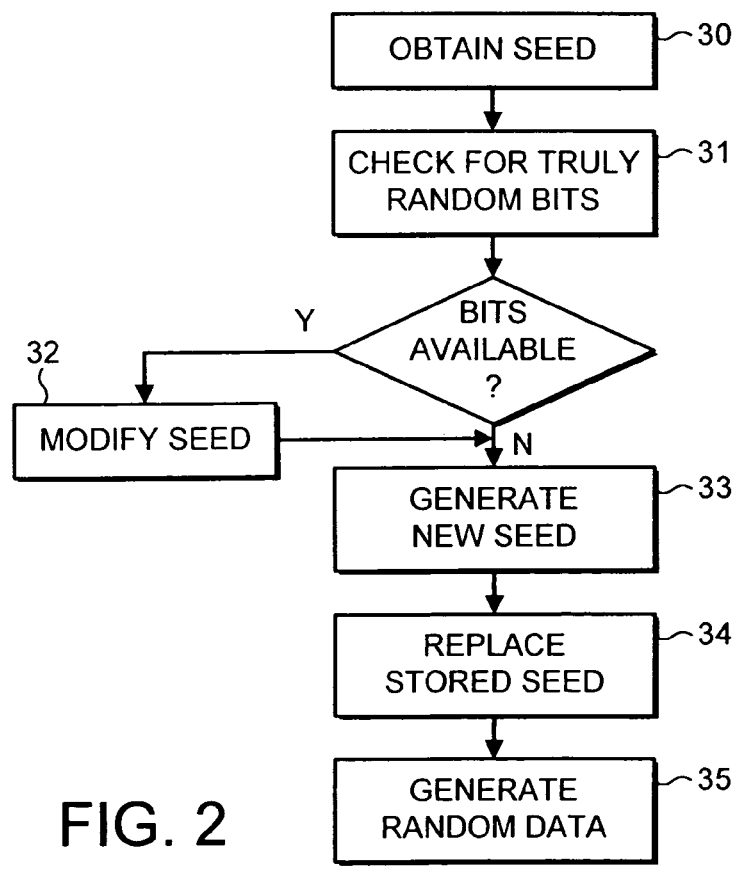
FIG. 2 illustrates the steps of an algorithm for generating random numbers.

The algorithm is illustrated generally in FIG. 2.

When the algorithm is called upon to generate a random number, the seed stored in the specified location 9 is obtained (step 30 in FIG. 2). The seed as obtained from the specified location is stored as a variable x. Then a check is made on store 10 to find whether L truly-random bits are available from the source 8 (step 31).

If L truly-random bits are available then those bits are loaded into a variable z and the store 11 is reset. Then step 32 of the algorithm is executed to modify the variable x in accordance with those truly random bits. The variable x is modified by being set equal to:

$$(x \oplus z) \bmod M$$

where the symbol $\oplus$ represents exclusive-ORing of each of L predetermined bits of x with the corresponding bits of z. The result of exclusive-OR operation is reduced to modulo M in order to keep it within arithmetic bounds of the algorithm. The specification of which bits of x are to be exclusive-ORed with which bits of z may suitably be defined at system build time.

If no truly-random bits are available then x is not modified.

The random data that is to be output from the random number generator is then generated and stored in variable v. Variable v is set equal to $x^{K_1} \bmod M$ (step 35).

The value of v is used as a supply of random bits which are made available at output 7.

Then the seed for the next iteration of the algorithm is formed in variable w, which is set equal to $(x+1)^{K_2} \bmod M$ (step 33).

Finally, the value of w is stored in the specified location 9 so as to replace the Previous seed value, and allow it to serve as the initial value of x for the next iteration (step 34).

Instead of exclusive-ORing the seed value with the truly random bits, other approaches could be used. For example, in a suitable algorithm another value than the input seed could be modified in dependence on the random data. Specifically, in the above algorithm the output seed value could be modified. Other modifications than exclusive-ORing, such as arithmetic shifting, or addition, could be used.

Numerous methods are available for generating the truly random data. Examples include digitising noisy analogue values from analogue sensors in the device, such voltage levels from a temperature sensor 14; or timing intervals between keypresses by a user on a keypad 15. A preferred method makes use of a pair of oscillators 12, 13 having different levels of short-term accuracy, i.e. 'jitter', and preferably having substantially different rates.

The device of FIG. 1 is a radio communication device. Oscillator 12 is relatively fast, relatively accurate and has relatively low jitter. Oscillator 12 is used for modulation of signals for transmission at radio frequency and suitably has a frequency of a few tens of megahertz, for example 13 or 26 MHz for a GSM-based system. Oscillator 13 is a slower, less accurate and more jittery oscillator, which could be used, for example, for interval timing between periods when the faster oscillator is switched off. The frequency of oscillator 13 could be a few kHz. The high accuracy oscillator 12 is suitably timed from a crystal, whereas the low accuracy oscillator 13 is suitably based on a simple resistor and capacitor circuit which may be on the same integrated circuit as the processor 2. Thus there is likely to be drift between the frequencies of the oscillators 12 and 13 due, for instance, to temperature variations and due to random fluctuations due to thermal noise in the resistor.

In order to generate random data a counter 16 counts the number of transitions of the fast oscillator in a predetermined, preferably small, number of periods of the slow oscillator. Because the jitter in the slow oscillator is in the same order as, or larger than, the period of the oscillator 12, the lowest significant bits of this count will be truly random. Therefore, one or more of those lowest significant bits are used as the random data. For example, where the frequency of the fast oscillator is 16 MHz and the frequency of the slower oscillator is 1 kHz, in typical conditions the bottom 1 or 2 bits of this count may be used as the random data. This count is performed periodically, and the resulting bits stored in the store 10. Thus, after the count has been performed new data will be available to the random number generator. When the count has not been performed since the last call of the random number generator new data will not be available, and in that case the random number generator can still provide an output since it can operate whether or not new truly random data is available.

The processor could be dedicated to the formation of random numbers, or could perform other functions too. In the latter case the random numbers described herein as being generated by the processor could be subsequently processed in further operations carried out by the processor itself.

The present invention may include any feature or combination of features disclosed herein either implicitly or explicitly or any generalisation thereof, irrespective of whether it relates to the presently claimed invention. In view of the foregoing description it will be evident to a person skilled in the art that various modifications may be made within the scope of the invention.

The invention claimed is:

1. A method for generating random data, the method comprising repeatedly performing a series of operations, and the series of operations comprising processing a seed value of a first predetermined number of bits by means of a modulo exponentiation algorithm to generate a resulting value for use as the seed value in a subsequent performance of the series of operations and to generate output random data;
   the series of operations also comprising:
   collecting new truly random data at a source;
   determining whether the collected truly random data comprises a second predetermined number of bits; and
   only if the second predetermined number of bits is available, modifying the generation of at least the resulting value in dependence on the new truly random data;
   wherein said modifying step comprises performing an operation on at least some of the first predetermined number of bits of the seed value with a corresponding second predetermined number of bits of collected truly random data;
   wherein the truly random data is generated by comparing the rates of two oscillators;
   wherein one of the oscillators generates a signal for radio frequency modulation or demodulation of communication data, and wherein the other of the oscillators generates a signal for timing of idle communication periods.

2. A method as claimed in claim 1, wherein the said modifying step comprises modifying the seed value prior to generating the resulting value.

3. A method as claimed in claim 2, wherein said operation comprises an exclusive-OR operation.

4. A method as claimed in claim 1, wherein the output random data is generated by processing the resulting value.

5. A method as claimed in claim 1, wherein only one of the oscillators is a crystal-controlled oscillator.

6. A method as claimed in claim 1, wherein the truly random data is generated by counting the number of oscillations of the one of the oscillators in a predetermined number of oscillations of the other of the oscillators.

7. A method as claimed in claim 6, wherein the truly random data is one or more of the least significant bits of the said number of oscillations.

8. A method as claimed in claim 6, comprising adjusting the rate of one of the oscillators in dependence on at least one of the most significant bits of the said number of oscillations.

9. A method as claimed in claim 1, wherein the rate of one of the oscillators is at least 100 times that of the other oscillator.

10. The method of claim 1 wherein the step of processing the seed value comprises:
    processing the seed value by a first modulo exponentiation step to generate a resulting value for use as the seed value in a subsequent performance of the series of operations; and
    processing the seed value by a second modulo exponentiation step to generate output random data.

11. The method of claim 1, further comprising collecting truly random data to form an initial seed of the first predetermined number of truly random bits.

12. A device for generating random data, the device comprising:
    a source of truly random data, comprising a first oscillator that generates a signal for radio frequency modulation or demodulation of communication data, a second oscillator that generates a signal for timing of idle communication periods, and a counter that compares rates of said first and second oscillators;
    a first store for storing a seed value of a first predetermined number of bits;
    processing means for performing a series of operations comprising processing the seed value by means of a modulo exponentiation algorithm to generate a resulting value for storage in the first store for use as the seed value in a subsequent performance of the series of operations and to generate output random data; and
    a second store for storing new truly random data from the source;
    wherein the series of operations also comprises:
    determining whether a second predetermined number of bits of new truly random data is available from the second store; and
    only if the second predetermined number of bits is available, modifying the generation of at least the resulting value in dependence on the new truly random data by performing an operation on at least some of said first predetermined number of bits of said seed value with a corresponding second predetermined number of bits of available truly random data.

13. A communication device comprising a device as claimed in claim 12.

14. The device of claim 12, wherein said seed value processing operation comprises:
    processing the seed value by a first modulo exponentiation step to generate a resulting value for use as the seed value in a subsequent performance of the series of operations; and
    processing the seed value by a second modulo exponentiation step to generate output random data.

* * * * *